(12) United States Patent
Dunahoo (10) Patent No.: US 11,146,050 B2
(45) Date of Patent: Oct. 12, 2021

(54) APPARATUS, SYSTEMS, AND METHODS FOR INCREASING THE LIFESPAN OF WELDING CABLE COVERS

(71) Applicant: ILLINOIS TOOL WORKS INC., Glenview, IL (US)

(72) Inventor: Jason Dunahoo, De Pere, WI (US)

(73) Assignee: ILLINOIS TOOL WORKS INC., Glenview, IL (US)

(*) Notice: Subject to any disclaimer, the term of this patent is extended or adjusted under 35 U.S.C. 154(b) by 0 days.

(21) Appl. No.: 16/388,253

(22) Filed: Apr. 18, 2019

(65) Prior Publication Data
US 2020/0335955 A1    Oct. 22, 2020

(51) Int. Cl.
*H02G 3/04* (2006.01)
*H01B 9/00* (2006.01)

(52) U.S. Cl.
CPC ......... *H02G 3/0462* (2013.01); *H02G 3/0406* (2013.01); *H01B 9/001* (2013.01)

(58) Field of Classification Search
CPC combination set(s) only.
See application file for complete search history.

(56) References Cited

U.S. PATENT DOCUMENTS

| | | | | |
|---|---|---|---|---|
| 2,157,377 A | * | 5/1939 | Zink | H01B 9/001 174/24 |
| 2,585,054 A | * | 2/1952 | Stachura | H02G 3/0481 174/36 |
| 2,756,172 A | * | 7/1956 | Kidd | F16L 59/026 138/147 |
| 2,939,902 A | * | 6/1960 | Wreford | H01B 9/001 174/15.7 |
| 2,941,027 A | * | 6/1960 | Svec | F16L 59/022 174/72 A |
| 3,049,584 A | * | 8/1962 | D Ascoli | H01B 1/20 174/120 SC |

(Continued)

FOREIGN PATENT DOCUMENTS

| | | | | |
|---|---|---|---|---|
| JP | 01249275 A | * | 10/1989 | ......... H02G 15/1813 |
| WO | 2008131467 | | 11/2008 | |

OTHER PUBLICATIONS

European Patent Office, "Extended European search report," issued in connection with Application No. 20166852.2, dated Sep. 15, 2020, 9 pages.

*Primary Examiner* — Krystal Robinson
(74) *Attorney, Agent, or Firm* — McAndrews, Held & Malloy, Ltd.

(57) ABSTRACT

Apparatus, systems, and methods for increasing the lifespan of welding cable covers are described. In some examples, a cable cover is wrapped around a welding cable to protect the welding cable from hazards of the welding environment. Complementary fasteners attached to the cable cover are fastened together to hold the cable cover in place around the welding cable. The fasteners are arranged and the cable cover is wrapped such that a protective region of the cable cover overlaps with the fasteners, shielding vulnerable stitching used to attach the fasteners to the cable cover. This added protection may prolong the time that fasteners remain attached to a cable cover, thereby prolonging the usable life of the cable cover, and/or prolonging the life of the welding cable(s) protected by the cable cover.

20 Claims, 6 Drawing Sheets

(56) References Cited

U.S. PATENT DOCUMENTS

| | | | | |
|---|---|---|---|---|
| 3,158,181 A | * | 11/1964 | Gore | B65D 75/30 138/168 |
| 3,254,678 A | * | 6/1966 | Plummer | F16L 58/10 138/139 |
| 3,654,049 A | * | 4/1972 | Ausnit | B65D 65/08 24/16 PB |
| 3,770,556 A | * | 11/1973 | Evans | H01B 3/441 428/77 |
| 3,941,159 A | * | 3/1976 | Toll | F16L 59/022 138/147 |
| 3,959,052 A | * | 5/1976 | Stanek | B29C 61/10 156/86 |
| 4,252,849 A | * | 2/1981 | Nishimura | B29C 61/003 138/110 |
| 4,268,559 A | * | 5/1981 | Smuckler | B29C 61/10 428/99 |
| 4,276,909 A | * | 7/1981 | Biscop | B29C 61/0625 138/156 |
| 4,281,211 A | * | 7/1981 | Tatum | H01B 7/0838 174/36 |
| 4,422,478 A | * | 12/1983 | Pentney | B29C 61/10 138/128 |
| 4,423,306 A | * | 12/1983 | Fox | B23K 9/32 174/112 |
| 4,499,926 A | * | 2/1985 | Friberg | H01B 9/001 138/123 |
| 4,815,172 A | | 3/1989 | Ward | |
| 4,920,235 A | * | 4/1990 | Yamaguchi | H01B 11/1033 138/167 |
| 4,939,819 A | * | 7/1990 | Moyer | H02G 3/0481 24/16 R |
| 4,944,976 A | * | 7/1990 | Plummer, III | H02G 3/0481 138/110 |
| 5,178,923 A | * | 1/1993 | Andrieu | H02G 3/0481 428/36.1 |
| 5,300,337 A | * | 4/1994 | Andrieu | D03D 27/00 428/36.1 |
| 5,378,522 A | * | 1/1995 | Lagomarsino | A44B 18/0069 24/306 |
| 5,391,838 A | * | 2/1995 | Plummer, III | H01B 11/1008 174/105 R |
| 5,535,787 A | * | 7/1996 | Howell | H02G 3/0487 138/110 |
| 5,556,495 A | * | 9/1996 | Ford | D06C 7/02 156/148 |
| 5,651,161 A | * | 7/1997 | Asta | A47L 9/24 138/110 |
| 5,901,756 A | * | 5/1999 | Goodrich | F16L 3/233 138/167 |
| 6,523,584 B1 | * | 2/2003 | Rehrig | H02G 3/0481 150/154 |
| 6,774,312 B2 | * | 8/2004 | Fatato | F16L 3/26 138/122 |
| 8,047,560 B2 | * | 11/2011 | Brockman | B60R 21/215 280/728.2 |
| 8,127,405 B2 | * | 3/2012 | Barger | F16L 3/233 24/16 R |
| 8,502,069 B2 | * | 8/2013 | Holland | H02G 15/18 174/36 |
| 8,872,033 B2 | * | 10/2014 | Oka | H01B 7/225 174/11 OR |
| 9,102,001 B2 | * | 8/2015 | Basit | H01B 7/282 |
| 9,362,725 B2 | * | 6/2016 | Morris | D04B 21/16 |
| 2002/0098311 A1 | * | 7/2002 | Lindner | B32B 5/26 428/40.1 |
| 2020/0203939 A1 | * | 6/2020 | Gooding | H02G 9/08 |

* cited by examiner

APPARATUS, SYSTEMS, AND METHODS FOR INCREASING THE LIFESPAN OF WELDING CABLE COVERS

TECHNICAL FIELD

The present disclosure generally relates to welding cable covers, more particularly, to increasing the lifespan of welding cable covers.

BACKGROUND

Welding systems are often used in harsh and/or abrasive environments, such as, for example, factory floors, shipyards, construction sites, etc. Welding cables (and/or hoses) used by the welding systems sometimes suffer wear and tear due to the harsh welding environment. This wear and tear can shorten the useful lifespan of the welding cables. Some welding systems therefore use cable covers (and/or sheaths) to protect the welding cables and/or increase welding cable lifespans.

Limitations and disadvantages of conventional and traditional approaches will become apparent to one of skill in the art, through comparison of such systems with the present disclosure as set forth in the remainder of the present application with reference to the drawings.

BRIEF SUMMARY

The present disclosure is directed to increasing the lifespan of welding cable covers, substantially as illustrated by and/or described in connection with at least one of the figures, and as set forth more completely in the claims.

These and other advantages, aspects and novel features of the present disclosure, as well as details of an illustrated example thereof, will be more fully understood from the following description and drawings.

The figures are not necessarily to scale. Where appropriate, the same or similar reference numerals are used in the figures to refer to similar or identical elements. For example, reference numerals utilizing lettering (e.g., first fastener 302a, second fastener 302b) refer to instances of the same reference numeral that does not have the lettering (e.g., fasteners 302).

DETAILED DESCRIPTION

Some examples of the present disclosure relate to apparatus, systems, and methods for increasing the lifespan of welding cable covers (and/or sheaths). Conventionally, a welding cable is protected from an abrasive and/or otherwise harsh welding environment by a cable cover (and/or sheath). The cable cover may comprise a flexible material (e.g., leather) several feet long that is wrapped around a length of the welding cable. In some examples, the cable cover is secured around the welding cable by fasteners (e.g., hook and loop fasteners, tongue and groove fasteners, buttons, zippers, magnets, snaps, etc.) that are attached (e.g., via stitching) to the cable cover. Thereby, the cable cover can be secured around the welding cable when the fasteners fasten together.

However, the fasteners of conventional cable covers sometimes fall off of, and/or become unattached from, the cable covers. For instance, the exposed stitching that attaches the fasteners to the cable cover material may become damaged and/or worn because of the hazardous welding environment. If the stitching loosens, breaks, severs, and/or otherwise ceases to attach the fasteners to the cable cover, the fasteners may become unattached from the cable cover. If the fasteners become unattached form the cable cover, the cable cover may unwrap from around the weld cable, even if the fasteners themselves remain fastened together. If the cable cover becomes unwrapped, the welding cable itself may become exposed to the hazardous welding environment.

The present disclosure therefore contemplates ways to provide additional protection to the stitching coupling the fasteners to the cable cover. This added protection may increase the lifespan of the stitching, the fasteners, the cable cover, and/or welding cable.

Figure 1:
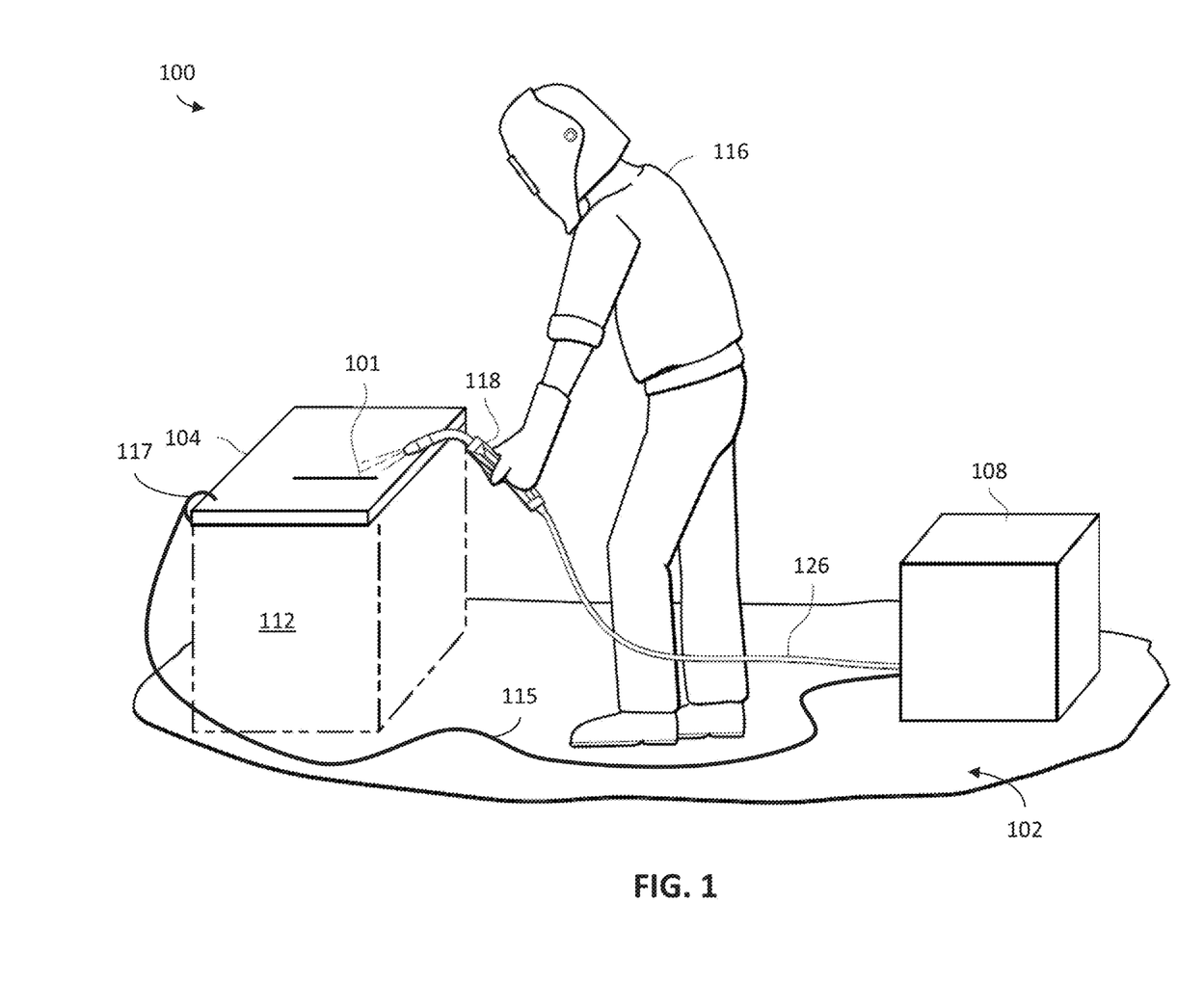
FIG. 1 shows an example welding system, in accordance with aspects of this disclosure.

FIG. 1 shows an example welding system 100. As shown, the welding system 100 includes a welding torch 118 and work clamp 117 coupled to a welding-type power supply 108 within a welding cell 102. In the example of FIG. 1, an operator 116 is handling the welding torch 118 near a welding bench 112. While a human operator 116 is shown in FIG. 1, in some examples, the operator 116 may be a robot and/or automated welding machine.

In the example of FIG. 1, the welding torch 118 is coupled to the welding-type power supply 108 via a welding cable 126. A clamp 117 is also coupled to the welding-type power supply 108 via a clamp cable 115. In some examples, the welding-type power supply 108 may control and/or include a gas supply and/or wire feeder. In some examples, the welding-type power supply 108 may be separate from the gas supply and/or wire feeder, and may use one or more gas cables, control cables, power cables, and/or other connecting cables to connect to the gas supply and/or wire feeder. In some examples, welding-type power may be routed though the power cable(s), clamp cable 115, and/or the welding cable 126 (along with gas and/or wire) in order to produce a weld 101 on a workpiece 104.

In some examples, a cable cover may be used to protect the clamp cable 115 and/or welding cable 126 (as well as the power, gas, and/or wire routed therethrough) during welding operations. If left unprotected, the clamp cable 115 and/or welding cable 126 may become worn and/or damaged due to hazards of the welding environment, such as, for example, heat, sparks, spatter, molten material, metals, shavings, particulates, abrasives, equipment, machinery, operators, etc. By covering the welding cable 126 and/or clamp cable 115 to shield against these hazards, the cable cover can increase the usable lifespan of the clamp cable 115 and/or welding cable 126.

Figures 2A, 2B:
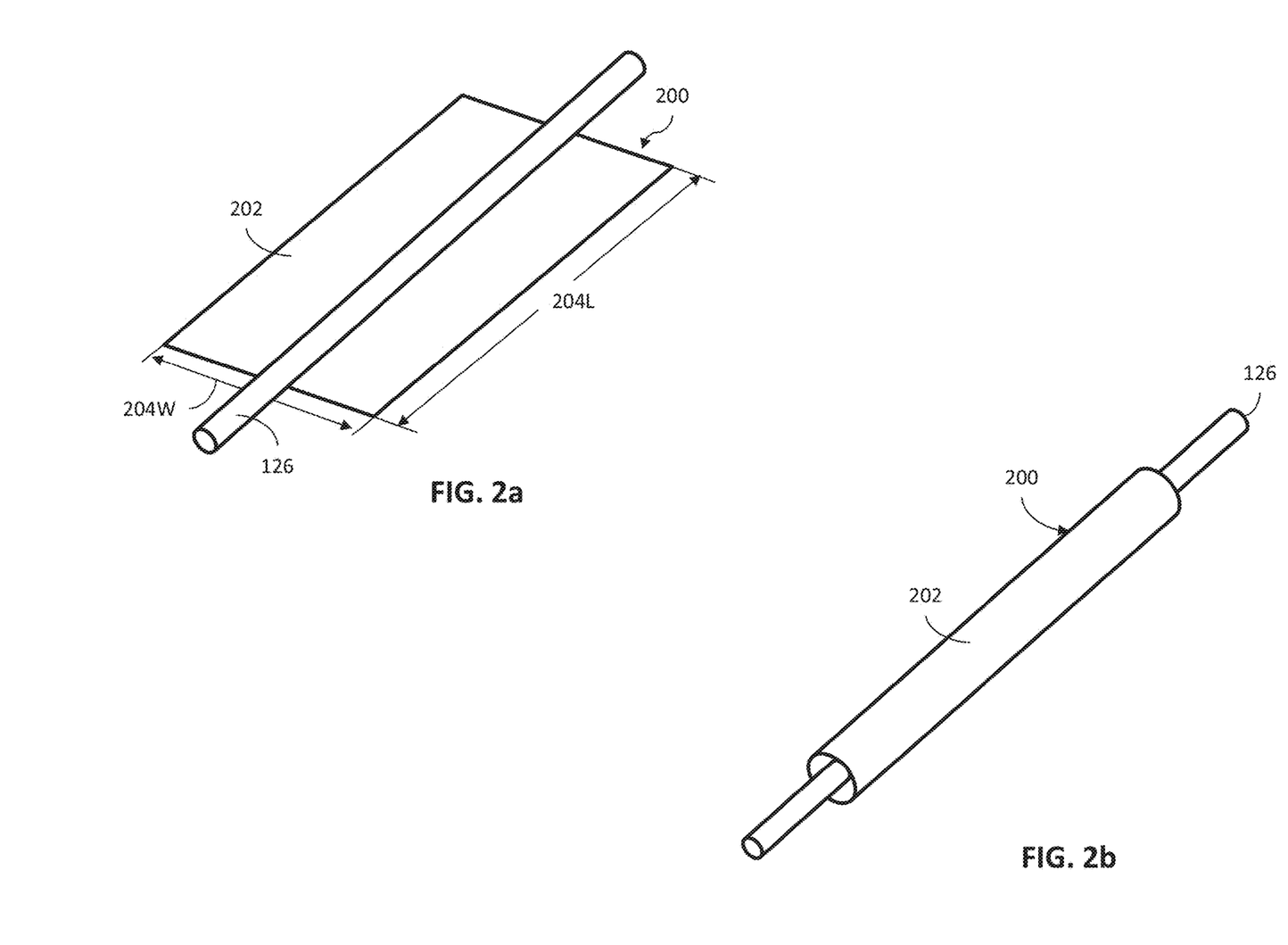
FIG. 2a is a perspective view of an example cable cover and an example welding cable portion, in accordance with aspects of this disclosure.
FIG. 2b is a perspective view of the example cable cover of FIG. 2a wrapped around the example welding cable portion of FIG. 2a, in accordance with aspects of this disclosure.

FIGS. 2a-2b show examples of a cable cover 200 in relation to a portion of the welding cable 126. While only the welding cable 126 is shown, it should be understood that the clamp cable 115 (and/or a gas cable connecting the gas supply to the welding-type power supply 108 or wire feeder, a control cable or power cable connecting the wire feeder to the welding-type power supply 108, a cooling cable, and/or other appropriate weld cabling) may be equally applicable. Additionally, it should be understood that the portion of the welding cable 126 shown may be a substantially complete portion (e.g., omitting only the connection to the torch 118 and/or power supply 108) or a smaller portion.

In the example of FIGS. 2a-2b, the cable cover 200 is a flexible material 202, such as, for example leather or a chlorosulfonated polyethylene (CSPE) synthetic rubber material (e.g., commonly referred to as Hypalon®, available from DuPont Performance Elastomers). In the example of FIG. 2a, the cable cover 200 is laid flat, with the welding cable 126 extending through an approximate center of the cable cover 200. As shown, the cable cover 200 has a length 204L that is larger than its width 204W when flat. In some examples, the cable cover 200 may have a length of several feet and/or meters (e.g., 5, 10, 15, 20, 25, 35, 50, 100, 200 etc.). In some examples, the cable cover 200 may have a width of a foot or less and/or a meter or less.

In the example of FIG. 2b, the cable cover 200 has been wrapped around the welding cable 126 to provide a protective sheath to shield the welding cable 126 from hazards of the welding environment. As shown, the cable cover 200 encircles the majority of the shown welding cable 126. While exposed portions of the welding cable 126 are shown as extending from the ends of the cable cover 200, in some examples, these exposed portions may be minimal, so as to shield as much of the welding cable as possible.

In some examples, fasteners are used to keep the cable cover 200 in place around the welding cable 126. In some examples, the fasteners may include hook and loop fasteners (e.g., commonly referred to as Velcro®, available from DuPont), tongue and groove fasteners, buttons, zippers, magnets, snaps, clasps, and/or any other appropriate fasteners. In some examples, the fasteners are attached to the flexible material 202 of the cable cover 200, such as through sewing and/or stitching. In some examples, one fastener is attached at or near one edge of the flexible material 202, while another, complementary, fastener is attached at or near an opposite edge of the flexible material 202. In some examples, the fasteners are attached along the length 204L of the flexible material 202, such that the fasteners may be fastened together when the cable cover 200 is wrapped around the welding cable 126. In this way, the cable cover 200 may be secured around the welding cable 126 and prevented from unwrapping back to the flat position shown in FIG. 2a.

Figure 3A:
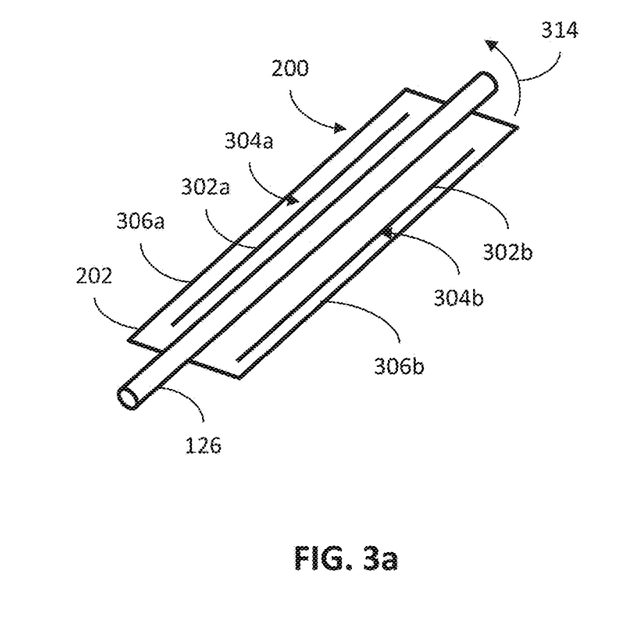
FIG. 3a is a perspective view of an example cable cover with an example fastener arrangement, and an example welding cable portion, in accordance with aspects of this disclosure.
Figure 3B:
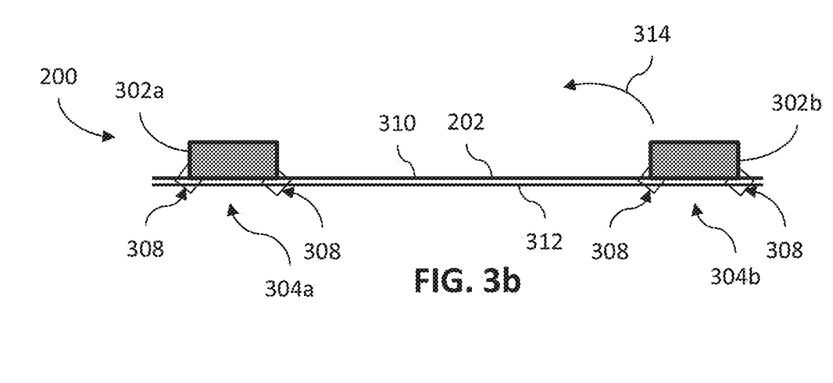
FIG. 3b is an enlarged end view of the example cable cover and fastener arrangement of FIG. 3a, in accordance with aspects of this disclosure.
Figure 3C:
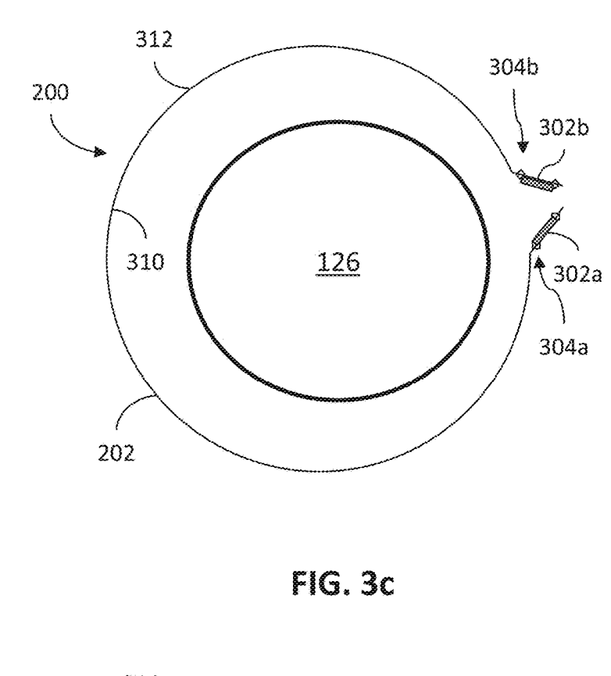
FIG. 3c is an end view of the example cable cover, fastener arrangement, and welding cable portion of FIG. 3a, with the example cable cover wrapped around the welding cable portion, in accordance with aspects of this disclosure.
Figure 4A:
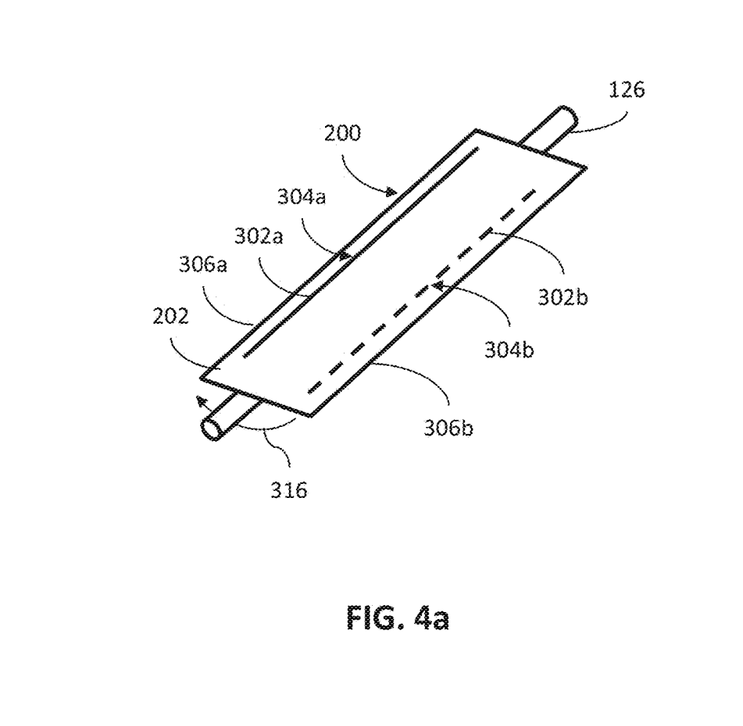
FIG. 4a is a perspective view of an example cable cover with another example fastener arrangement, and an example welding cable portion, in accordance with aspects of this disclosure.
Figure 4B:
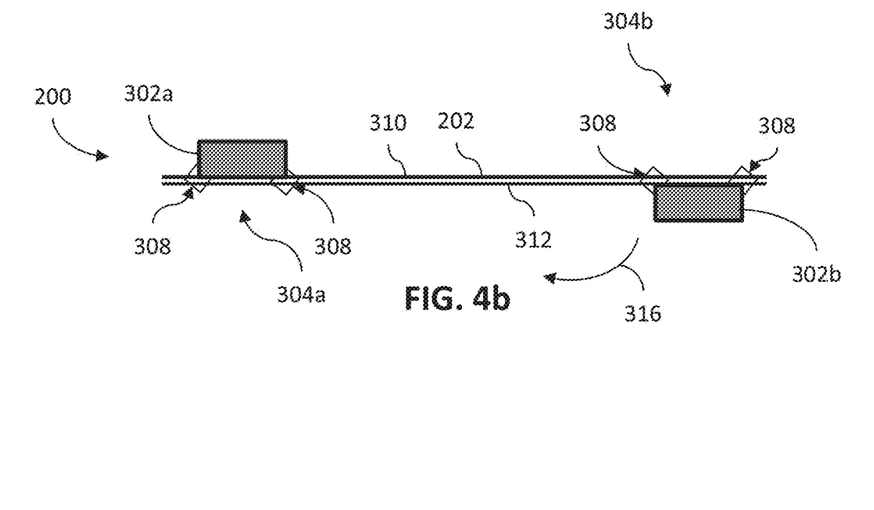
FIG. 4b is an enlarged end view of the example cable cover and fastener arrangement of FIG. 4a, in accordance with aspects of this disclosure.
Figure 4C:
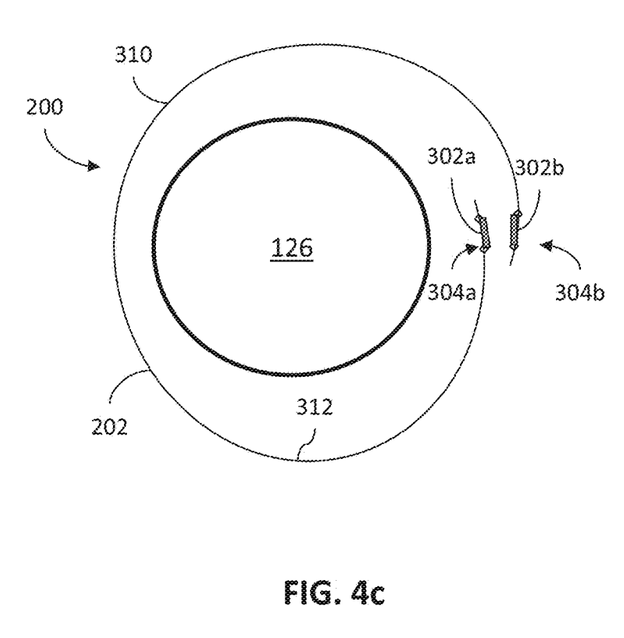
FIG. 4c is an end view of the example cable cover, fastener arrangement, and welding cable portion of FIG. 4a, with the example cable cover wrapped around the welding cable portion, in accordance with aspects of this disclosure.
Figure 5A:
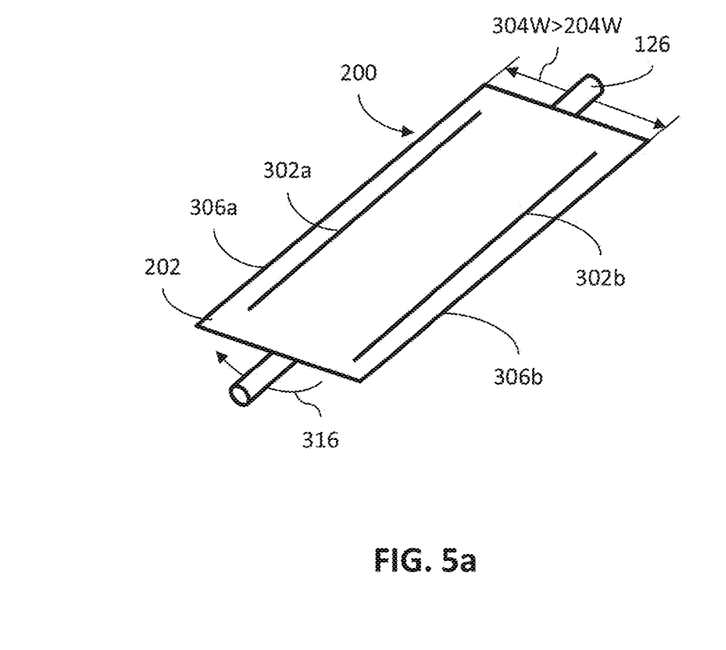
FIG. 5a is a perspective view of an example cable cover with another example fastener arrangement, and an example welding cable portion, in accordance with aspects of this disclosure.
Figure 5B:
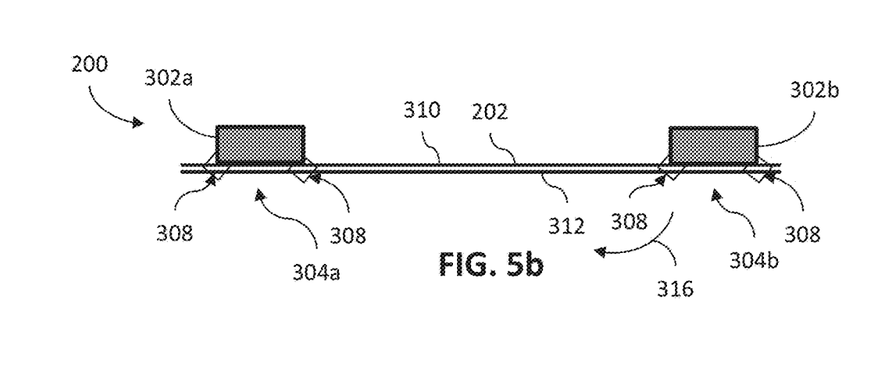
FIG. 5b is an enlarged end view of the example cable cover and fastener arrangement of FIG. 5a, in accordance with aspects of this disclosure.
Figure 5C:
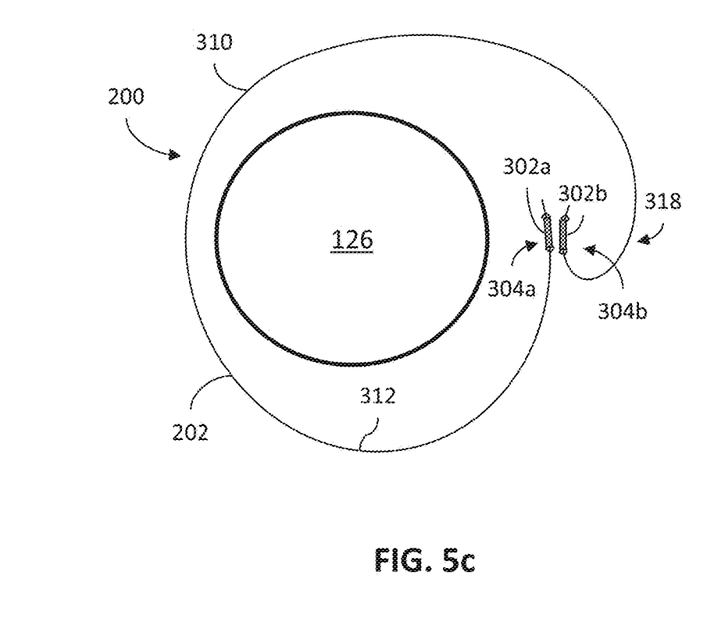
FIG. 5c is an end view of the example cable cover, fastener arrangement, and welding cable portion of FIG. 5a, with the example cable cover wrapped around the welding cable portion, in accordance with aspects of this disclosure.

FIGS. 3a-5c show different example arrangements of fasteners. FIGS. 3a, 4a, and 5a show perspective views of the welding cable 126 and a flat cable cover 200, similar to FIG. 2a. FIGS. 3b, 4b, and 5b show enlarged end views of the flat cable cover 200. FIGS. 3c, 4c, and 5c show enlarged end views of the cable cover 200 wrapped around the welding cable 126.

In the example arrangements of FIGS. 3a-5c, a first fastener 302a is coupled to the flexible material 202 at a first fastening region 304a, near a first edge 306a, while a second fastener 302b, complementary to the first fastener 302a, is coupled to the flexible material at a second fastening region 304b, near a second edge 306b, opposite the first edge 306a. While shown as single continuous strips for convenience and ease of understanding, in some examples the first fastener 302a and/or second fastener 302a may instead be several individual fasteners arranged along a (e.g., linear) portion of the flexible material 202.

In the examples of FIGS. 3a-5c, both fasteners 302 are shown coupled to the flexible material 202 with stitching 308. However, in some examples, other mechanisms of coupling the fasteners 302 to the flexible material 202 may be used. As shown, the stitching 308 extends through both a first side 310 and second side 312 of the flexible material 202, such that the stitching 308 is accessible and/or exposed on both the first side 310 and second side 312 of the flexible material 202.

In the examples of FIGS. 3a-3c, the first and second fasteners 302 extend out from the first side 310 of the flexible material 202. As shown, the flexible material 202 is wrapped around the welding cable 126 in the direction of arrow 314, such that the first side 310 becomes an interior of the cable cover 200, facing inwards towards the welding cable 126, while the second side 312 becomes an exterior of the cable cover 200, facing outwards towards the welding environment. In the example of FIGS. 3a-3c, the stitching 308 of both fasteners 302 are exposed to the hazards of the welding environment on the second side 312 when the fasteners 302 are fastened together.

FIGS. 4a-4c show another example arrangement of the fasteners 302. As shown, the first fastener 302a is coupled to the flexible material 202 such that it extends out from the first side 310 of the flexible material 202, similar to the example arrangement of FIGS. 3a-3c. However, the second fastener 302b is coupled to the flexible material 202 such that it extends out from the second side 312 of the flexible material 202. In order to connect the two fasteners 302, the flexible material 202 is wrapped around the welding cable 126 in the direction of arrow 316, such that the second side 312 becomes an interior of the cable cover 200, facing inwards towards the welding cable 126, while the first side 310 becomes an exterior of the cable cover 200, facing outwards towards the welding environment. As the second fastener 302b extends from the second side 312, which forms the interior facing portion of the cable cover 200, the second fastener 302b also faces inwardly towards the interior. In the example of FIGS. 4a-4c, the second fastening region 304b somewhat protects the stitching 308 of the first fastening region 304a from the welding environment when the fasteners 302 are fastened together. However, the stitching 308 on the first side 310 of the flexible material 202 at the second fastening region 304 is still exposed to the hazards of the welding environment.

FIGS. 5a-5c show another example arrangement of fasteners. As shown, the first and second fasteners 302 extend out from the first side 310 of the flexible material 202, similar to that of FIGS. 3a-3c. However, the flexible material 202 is wrapped around the welding cable 126 in the direction of arrow 316, similar to FIGS. 4a-4c, such that the second side 312 becomes an interior of the cable cover 200, facing inwards towards the welding cable 126, while the first side 310 becomes an exterior of the cable cover 200, facing outwards towards the welding environment, for the majority of the encircled cable cover 200.

In the example of FIGS. 5a-5c, there also exists an overlapping region 318. The overlapping region 318 occurs naturally (and/or as a necessity) when connecting the fasteners 302 by wrapping the flexible material 202 in the direction shown by arrow 316. As shown, the width 304W of the flexible material 202 is increased to a width greater than the normal width 204W in order to accommodate this additional overlapping region 318.

In the example of FIGS. 5a-5c, the second fastening region 304b somewhat protects the stitching 308 of the first fastening region 304a from the welding environment when the fasteners 302 are fastened together. Additionally, the overlapping region 318 serves to shield the stitching 308 at the first and second fastening regions 304, such that there is no stitching 308 exposed to the hazards of the welding environment. In this way, the example arrangement of FIGS. 5a-5c provides an arrangement for shielding all the stitching 308 of the cable cover 200 from the hazards of the welding environment. Such an arrangement may prolong the time the fasteners 302 remain attached to the flexible material 202, and thereby prolong the life of the cable cover 200, and/or prolong the life of the welding cable 126 the cable cover 200 protects.

Figure 6A:
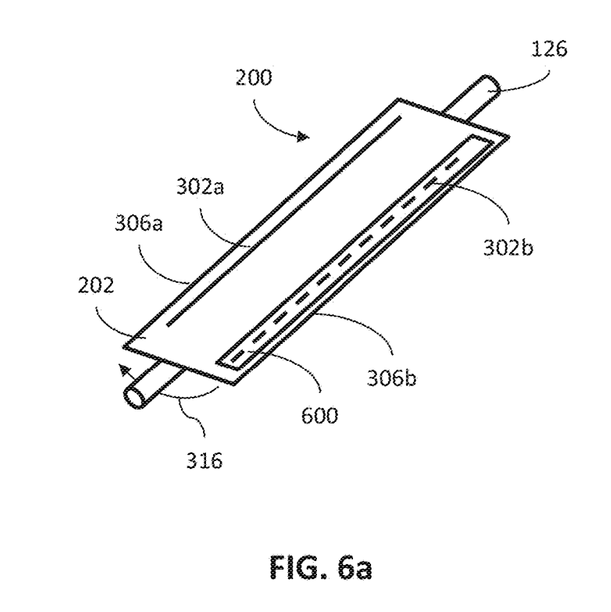
FIG. 6a is a perspective view of the example cable cover, fastener arrangement, and welding cable portion of FIG. 4a, with a supplemental material attached to the cable cover, in accordance with aspects of this disclosure.
Figure 6B:
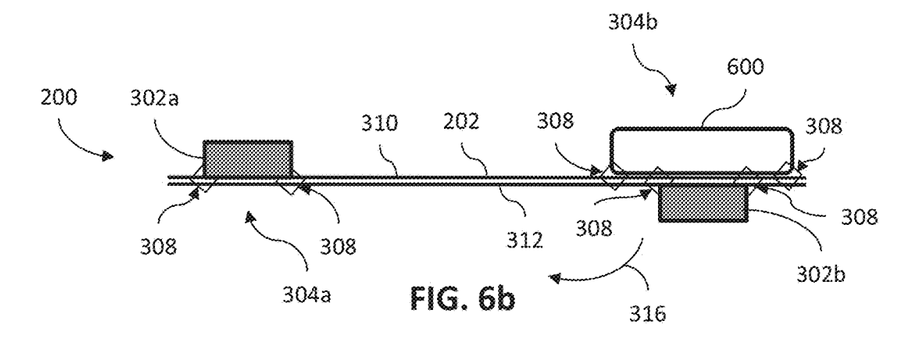
FIG. 6b is an enlarged end view of the example cable cover, fastener arrangement, and supplemental material of FIG. 6a, in accordance with aspects of this disclosure.
Figure 6C:
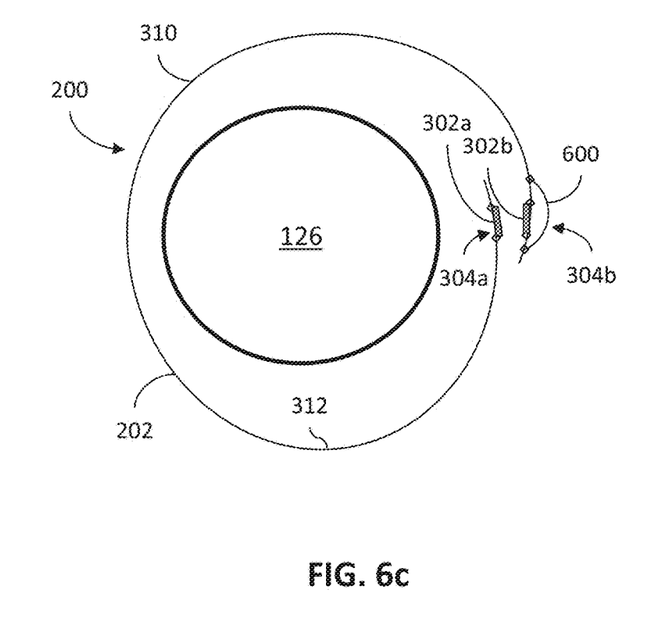
FIG. 6c is an end view of the example cable cover, fastener arrangement, welding cable portion, and supplemental material of FIG. 6a, with the example cable cover wrapped around the welding cable portion, in accordance with aspects of this disclosure.

FIGS. 6a-6c show an example of a supplemental material 600 attached to the flexible material 202 to shield the stitching 308 of the second fastener 302. In some examples, the supplemental material 600 may be formed of the same material as the flexible material 202. As shown, the supplemental material 600 is coupled to the flexible material 202 via its own stitching 308. More particularly, the supplemental material 600 is coupled to the first side 310 of the flexible material 202 at the second fastening region 304b to shield the exposed stitching 308 of the second fastener 302b from the hazards of the welding environment. Thus, when the flexible material 202 is wrapped around the welding cable 126 in the direction of arrow 316, the second fastening region 304b will protect the stitching 308 of the first fastening region 304a from the welding environment when the fasteners 302 are fastened together, and the supplemental material will protect the stitching of the second fastening region 304b from the welding environment. While the stitching 308 coupling the supplemental material 600 to the flexible material 202 will still be exposed to the hazards of the welding environment, the supplemental material 600 may still prolong the time the fasteners 302 remain attached to the flexible material 202, thereby prolonging the life of the cable cover 200, and/or prolonging the life of the welding cable 126.

Though the supplemental material 600 is shown with respect to the fastener arrangement of FIGS. 4a-4c, it should be understood that the supplemental material 600 may be used with any of the arrangements shown herein. Likewise, while the supplemental material 600 is shown only shielding the stitching 308 of the second fastener 302b in the second fastening region 304b, it should be understood that supplemental material 600 may additionally, or alternatively, be coupled to the flexible material 202 at the first fastening region 304a to shield the stitching 308 of the first fastener 302a.

The overlapping region 318 and/or supplemental material 600 presented herein can be used to prolong the time that fasteners 302 remain attached to a cable cover 200, thereby prolonging the usable life of the cable cover 200 and/or welding cable 126.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

As used herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z".

As utilized herein, the terms "e.g.," and "for example" set off lists of one or more non-limiting examples, instances, or illustrations.

As used herein, the terms "coupled," "coupled to," and "coupled with," each mean a structural and/or electrical connection, whether attached, affixed, connected, joined, fastened, linked, and/or otherwise secured. As used herein, the term "attach" means to affix, couple, connect, join, fasten, link, and/or otherwise secure. As used herein, the term "connect" means to attach, affix, couple, join, fasten, link, and/or otherwise secure.

The term "power" is used throughout this specification for convenience, but also includes related measures such as energy, current, voltage, and enthalpy. For example, controlling "power" may involve controlling voltage, current, energy, and/or enthalpy, and/or controlling based on "power" may involve controlling based on voltage, current, energy, and/or enthalpy.

As used herein, welding-type power refers to power suitable for welding, cladding, brazing, plasma cutting, induction heating, carbon arc cutting, and/or hot wire welding/preheating (including laser welding and laser cladding), carbon arc cutting or gouging, and/or resistive preheating.

As used herein, a welding-type power supply and/or power source refers to any device capable of, when power is applied thereto, supplying welding, cladding, brazing, plasma cutting, induction heating, laser (including laser welding, laser hybrid, and laser cladding), carbon arc cutting or gouging, and/or resistive preheating, including but not limited to transformer-rectifiers, inverters, converters, resonant power supplies, quasi-resonant power supplies, switch-mode power supplies, etc., as well as control circuitry and other ancillary circuitry associated therewith.

What is claimed is:

1. A protective cover for a welding cable, comprising:
a flexible material configured to wrap around the welding cable;
a first fastener coupled to an exterior side of the flexible material at a first fastening region; and
a second fastener coupled to the exterior side of the flexible material at a second fastening region, the second fastener being complementary to the first fastener to enable fastening together of the first and second fasteners,
wherein the flexible material is configured to be wrapped around the welding cable such that an interior side of the flexible material, opposite the exterior side, faces the welding cable when the first and second fasteners are fastened together around the welding cable, resulting in an overlapping region of the flexible material overlapping and protecting the second fastening region when the first and second fasteners are fastened together around the welding cable, the overlapping region being adjacent the second fastening region, and the overlapping region not including any fastener.

2. The protective cover of claim 1, wherein the interior side of the flexible material at the second fastening region faces the interior side of the flexible material at the overlapping region when the first and second fasteners are fastened together around the welding cable.

3. The protective cover of claim 1, wherein the first fastener or second fastener comprise a hook fastener, a loop fastener, a snap stud, a snap socket, a tongue, a groove, or a zipper half.

4. The protective cover of claim 1, wherein a first stitching couples the first fastener to the flexible material and a second stitching couples the second fastener to the flexible material.

5. The protective cover of claim 4, wherein the overlapping region shields the second stitching from hazards when the first and second fasteners are fastened together around the welding cable.

6. The protective cover of claim 4, wherein the first stitching or second stitching comprises a synthetic polyparaphenylene terephthalamide fiber, or the flexible material comprises a leather or chlorosulfonated polyethylene (CSPE) synthetic rubber material.

7. The protective cover of claim 4, wherein the overlapping region does not include any stitching.

8. A welding system, comprising:
a welding cable connecting together welding components of the welding system; and
a protective cover wrapped around the welding cable to shield the welding cable during welding operations, the protective cover comprising:
a first fastener coupled to an exterior side of the flexible material at a first fastening region; and
a second fastener coupled to the exterior side of the flexible material at a second fastening region, the second fastener being complementary to the first fastener to enable fastening together of the first and second fasteners,
wherein the flexible material wraps around the welding cable to fasten the first fastener to the second fastener such that an interior side of the flexible material, opposite the exterior side, faces the welding cable, resulting in an overlapping region of the flexible material overlapping and protecting the second fastening region, the overlapping region being adjacent the second fastening region, and the overlapping region not including any fastener.

9. The welding system of claim 8, wherein the interior side of the flexible material at the second fastening region faces the interior side of the flexible material at the overlapping region when the first and second fasteners are fastened together around the welding cable.

10. The welding system of claim 8, wherein the first fastener or second fastener comprise a hook fastener, a loop fastener, a snap stud, a snap socket, a tongue, a groove, or a zipper half.

11. The welding system of claim 8, wherein a first stitching couples the first fastener to the flexible material and a second stitching couples the second fastener to the flexible material.

12. The welding system of claim 11, wherein the overlapping region shields the second stitching from abrasion when the first and second fasteners are fastened together around the welding cable.

13. The welding system of claim 11, wherein the first stitching or second stitching comprises a synthetic polyparaphenylene terephthalamide fiber, or the flexible material comprises a leather or chlorosulfonated polyethylene (CSPE) synthetic rubber material.

14. The welding system of claim 11, wherein the overlapping region does not include any stitching.

15. A method, comprising:
providing a welding cable connecting together welding components of a welding system;
providing a flexible material having a first fastener coupled to an exterior side of the flexible material at a first fastening region and a second fastener coupled to the exterior side of the flexible material at a second fastening region;
wrapping the protective cover around the welding cable such that an overlapping region of the flexible material, adjacent the second fastening region, overlaps and protects the second fastening region, the overlapping region not including any fastener; and
fastening the second fastener to the first fastener to secure the protective cover around the welding cable.

16. The method of claim 15, wherein the interior side of the flexible material at the second fastening region faces the interior side of the flexible material at the overlapping region when the first and second fasteners are fastened together around the welding cable.

17. The welding system of claim 15, wherein the first fastener or second fastener comprise a hook fastener, a loop fastener, a snap stud, a snap socket, a tongue, a groove, or a zipper half.

18. The welding system of claim 15, wherein a first stitching couples the first fastener to the flexible material and a second stitching couples the second fastener to the flexible material.

19. The welding system of claim 18, wherein the overlapping region shields the second stitching from abrasion when the first and second fasteners are fastened together around the welding cable.

20. The welding system of claim 19, wherein the overlapping region does not include any stitching.

* * * * *